United States Patent
Lu et al.

(10) Patent No.: US 11,499,413 B2
(45) Date of Patent: Nov. 15, 2022

(54) METHODS, SYSTEMS, AND STORAGE MEDIA FOR PREDICTING PHYSICAL CHANGES TO A WELLHEAD IN AN AQUATIC VOLUME OF INTEREST

(71) Applicant: Chevron U.S.A. Inc., San Ramon, CA (US)

(72) Inventors: Wangming Lu, Katy, TX (US); Wei Wu, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 987 days.

(21) Appl. No.: 16/226,120

(22) Filed: Dec. 19, 2018

(65) Prior Publication Data

US 2020/0199996 A1    Jun. 25, 2020

(51) Int. Cl.
| | | |
|---|---|---|
| E21B 17/01 | (2006.01) | |
| G06N 3/08 | (2006.01) | |
| G06N 5/04 | (2006.01) | |
| G06N 20/00 | (2019.01) | |
| E21B 47/007 | (2012.01) | |
| G06N 3/04 | (2006.01) | |

(52) U.S. Cl.
CPC ......... *E21B 47/007* (2020.05); *G06N 3/0472* (2013.01); *G06N 3/08* (2013.01); *G06N 5/046* (2013.01); *G06N 20/00* (2019.01); *E21B 17/01* (2013.01)

(58) Field of Classification Search
CPC .......... E21B 17/01; G06N 3/08; G06N 5/046; G06N 20/00
See application file for complete search history.

(56) References Cited

U.S. PATENT DOCUMENTS

| | | | | |
|---|---|---|---|---|
| 8,074,720 | B2 * | 12/2011 | Radi | E21B 41/00 |
| | | | | 702/6 |
| 9,593,568 | B1 * | 3/2017 | LeMonds | E21B 47/001 |
| 10,968,731 | B2 * | 4/2021 | Gupta | E21B 33/0355 |
| 2015/0176237 | A1 * | 6/2015 | Li | E21B 17/01 |
| | | | | 703/2 |
| 2016/0237804 | A1 * | 8/2016 | Papadimitriou | E21B 47/007 |
| 2018/0095455 | A1 * | 4/2018 | Silva | G01M 5/0066 |
| 2021/0207471 | A1 * | 7/2021 | Cain | E21B 17/01 |

* cited by examiner

*Primary Examiner* — Matthew R Buck
(74) *Attorney, Agent, or Firm* — Esplin & Associates, PC (57) ABSTRACT

Methods, systems, and storage media for predicting physical changes to a wellhead coupled to a riser in an aquatic volume of interest are disclosed. Exemplary implementations may: obtain training data; obtain a machine learning algorithm; generate a riser response model by applying a machine learning algorithm to the training data; store the riser response model, obtain target environmental data, target tension data, and target mud data, generate predicted riser response data, transform predicted riser response data, generate a representation, and display the representation.

18 Claims, 7 Drawing Sheets

METHODS, SYSTEMS, AND STORAGE MEDIA FOR PREDICTING PHYSICAL CHANGES TO A WELLHEAD IN AN AQUATIC VOLUME OF INTEREST

FIELD OF THE DISCLOSURE

The present disclosure relates to systems and methods for predicting physical changes to a wellhead in an aquatic volume of interest.

SUMMARY

One aspect of the present disclosure relates to a method for predicting physical changes to a wellhead coupled to a riser in an aquatic volume of interest. The method may be implemented in a computer system including one or more physical computer processors, non-transient electronic storage, and a graphical user interface. The method may include obtaining, from the non-transient electronic storage, training data. The training data may include (i) environmental data, corresponding to the aquatic volume of interest, specifying one or more environmental parameter values affecting a riser in the aquatic volume of interest as a function of time, (ii) tension data, corresponding to the aquatic volume of interest, specifying one or more tension parameter values affecting a riser in the aquatic volume of interest as a function of time, (iii) mud data, corresponding to the aquatic volume of interest, specifying one or more mud parameter values affecting a riser in the aquatic volume of interest as a function of time, and (iv) riser response data specifying riser displacement values as a function of time. The method may include obtaining, from the non-transient electronic storage, a machine learning algorithm. The method may include generating, with the one or more physical computer processors, a riser response model by applying the machine learning algorithm to the training data. The method may include storing, in the non-transient electronic storage, the riser response model.

In implementations, the method may include obtaining, from the non-transient electronic storage, target environmental data, target tension data, and target mud data corresponding to the aquatic volume of interest. The target environmental data may specify the one or more environmental parameter values as a function of time. The target tension data may specify the one or more tension parameter values as a function of time. The target mud data may specify the one or more mud parameter values as a function of time. The method may include generating, with the one or more physical computer processors, predicted riser response data by applying the machine learning algorithm to the target environmental data, the target tension data, and the target mud data. The method may include transforming, with the one or more physical computer processors, the predicted riser response data to predicted wellhead fatigue data specifying predicted wellhead fatigue values as a function of time. The method may include generating, with the one or more physical computer processors, a representation of predicted changes to the wellhead using visual effects to depict at least a portion of the predicted wellhead fatigue data corresponding to the aquatic volume of interest. The method may include displaying, via the graphical user interface, the representation.

In implementations, transforming the predicted riser response data may include obtaining, from the non-transient electronic storage, wellhead data. The wellhead data may specify one or more wellhead parameter values affecting the wellhead. Transforming the predicted riser response data may include generating, with the one or more physical computer processors, a wellhead model to transform riser response data to the predicted wellhead fatigue data based on wellhead data and riser stack up data. Transforming the predicted riser response data may include generating, with the one or more physical computer processors, the predicted wellhead fatigue data by applying the wellhead model to the predicted riser response data.

In implementations, the wellhead data may include one or more of a wellhead configuration, material used in the wellhead, soil data specifying p-y values, soil data specifying T-Z values, cement data specifying cement property values, and/or cement data specifying cement level values.

In implementations, one or more environmental parameters corresponding to the environmental parameter data may include one or more of a current speed in the aquatic volume of interest as a function of time and depth, a current direction in the aquatic volume of interest as a function of time and depth, a wave height in the aquatic volume of interest as a function of time, a wave direction in the aquatic volume of interest as a function of time, a wave period in the aquatic volume of interest as a function of time, and/or a response amplitude operator for the riser.

In implementations, individual ones of the one or more environmental parameter values, the one or more tension parameter values, and the one or more mud parameter values are weighted.

In implementations, the machine learning algorithm may include a neural network regression An aspect of the present disclosure relates to a method for predicting physical changes to a wellhead coupled to a riser in an aquatic volume of interest. The method may be implemented in a computer system including one or more physical computer processors, non-transient electronic storage, and a graphical user interface. The method may include obtaining, from the non-transient electronic storage, target environmental data, target tension data, and target mud data corresponding to the aquatic volume of interest. The target environmental data may specify the one or more parameter values as a function of time. The target tension data may specify the one or more tension parameter values as a function of time. The target mud data may specify the one or more mud parameter values as a function of time. The method may include obtaining, from the non-transient electronic storage, a riser response model. The riser response model may have been generated by applying a machine learning algorithm to the training data. The training data may include (i) environmental data, corresponding to the aquatic volume of interest, specifying one or more environmental parameter values affecting a riser in the aquatic volume of interest as a function of time, (ii) tension data, corresponding to the aquatic volume of interest, specifying one or more tension parameter values affecting a riser in the aquatic volume of interest as a function of time, (iii) mud data, corresponding to the aquatic volume of interest, specifying one or more mud parameter values affecting a riser in the aquatic volume of interest as a function of time, and (iv) riser response data specifying riser displacement values as a function of time. The method may include generating, with the one or more physical computer processors, predicted riser response data by applying the riser response model to the target environmental data, the target tension data, and the target mud data. The method may include transforming, with the one or more physical computer processors, the predicted riser response data to predicted wellhead fatigue data specifying predicted wellhead fatigue values as a function of time. The method may include generating, with the one or more physical computer processors, a representation of predicted changes to the wellhead using visual effects to depict at least a portion of the predicted wellhead fatigue data corresponding to the aquatic volume of interest. The method may include displaying, via the graphical user interface, the representation.

In implementations, transforming the predicted riser response data may include obtaining, from the non-transient electronic storage, wellhead data. The wellhead data may specify one or more wellhead parameter values affecting the wellhead. Transforming the predicted riser response data may include generating, with the one or more physical computer processors, a wellhead model to transform riser response data to the predicted wellhead fatigue data based on wellhead data and riser stack up data. Transforming the predicted riser response data may include generating, with the one or more physical computer processors, the predicted wellhead fatigue data by applying the wellhead model to the predicted riser response data.

In implementations, the wellhead data may include one or more of a wellhead configuration, material used in the wellhead, soil data specifying p-y values, soil data specifying T-Z values, cement data specifying cement property values, and cement data specifying cement level values.

In implementations, one or more environmental parameters corresponding to the environmental parameter data may include one or more of a current speed in the aquatic volume of interest as a function of time and depth, a current direction in the aquatic volume of interest as a function of time and depth, a wave height in the aquatic volume of interest as a function of time, a wave direction in the aquatic volume of interest as a function of time, a wave period in the aquatic volume of interest as a function of time, and a response amplitude operator for the riser.

In implementations, individual ones of the one or more environmental parameter values, the one or more tension parameter values, and the one or more mud parameter values are weighted.

In implementations, the machine learning algorithm may include a neural network regression An aspect of the present disclosure relates to a system configured for predicting physical changes to a wellhead coupled to a riser in an aquatic volume of interest. The system may include, non-transient electronic storage, a graphical user interface, and/or one or more physical computer processors configured by machine-readable instructions. The processor(s) may be configured to obtain, from the non-transient electronic storage, training data. The training data may include (i) environmental data, corresponding to the aquatic volume of interest, specifying one or more environmental parameter values affecting a riser in the aquatic volume of interest as a function of time, (ii) tension data, corresponding to the aquatic volume of interest, specifying one or more tension parameter values affecting a riser in the aquatic volume of interest as a function of time, (iii) mud data, corresponding to the aquatic volume of interest, specifying one or more mud parameter values affecting a riser in the aquatic volume of interest as a function of time, and (iv) riser response data specifying riser displacement values as a function of time. The processor(s) may be configured to obtain, from the non-transient electronic storage, a machine learning algorithm. The processor(s) may be configured to generate, with the one or more physical computer processors, a riser response model by applying the machine learning algorithm to the training data. The processor(s) may be configured to store, in the non-transient electronic storage, the riser response model.

In implementations, the processor(s) may be configured to obtain, from the non-transient electronic storage, target environmental data, target tension data, and target mud data corresponding to the aquatic volume of interest. The target environmental data may specify the one or more environmental parameter values as a function of time. The target tension data may specify the one or more tension parameter values as a function of time. The target mud data may specify the one or more mud parameter values as a function of time. The processor(s) may be configured to generate, with the one or more physical computer processors, predicted riser response data by applying the riser response model to the target environmental data, the target tension data, and the target mud data. The processor(s) may be configured to transform, with the one or more physical computer processors, the predicted riser response data to predicted wellhead fatigue data specifying predicted wellhead fatigue values as a function of time. The processor(s) may be configured to generate, with the one or more physical computer processors, a representation of predicted changes to the wellhead using visual effects to depict at least a portion of the predicted wellhead fatigue data corresponding to the aquatic volume of interest. The processor(s) may be configured to display, via the graphical user interface, the representation.

In implementations, transforming the predicted riser response data may include obtaining, from the non-transient electronic storage, wellhead data. The wellhead data may specify one or more wellhead parameter values affecting the wellhead. Transforming the predicted riser response data may include generating, with the one or more physical computer processors, a wellhead model to transform riser response data to the predicted wellhead fatigue data based on wellhead data and riser stack up data. Transforming the predicted riser response data may include generating, with the one or more physical computer processors, the predicted wellhead fatigue data by applying the wellhead model to the predicted riser response data.

In implementations, the wellhead data may include one or more of a wellhead configuration, material used in the wellhead, soil data specifying p-y values, soil data specifying T-Z values, cement data specifying cement property values, and cement data specifying cement level values.

In implementations, one or more environmental parameters corresponding to the environmental parameter data may include one or more of a current speed in the aquatic volume of interest as a function of time and depth, a current direction in the aquatic volume of interest as a function of time and depth, a wave height in the aquatic volume of interest as a function of time, a wave direction in the aquatic volume of interest as a function of time, a wave period in the aquatic volume of interest as a function of time, and a response amplitude operator for the riser.

In implementations, individual ones of the one or more environmental parameter values, the one or more tension parameter values, and the one or more mud parameter values are weighted.

In implementations, the machine learning algorithm may include a neural network regression An aspect of the present disclosure relates to a non-transient computer-readable storage medium having instructions embodied thereon, the instructions being executable by one or more processors to perform a method for predicting physical changes to a wellhead coupled to a riser in an aquatic volume of interest. The method may include obtaining, from the non-transient electronic storage, training data. The training data may include environmental data, tension data, and mud data, corresponding to the aquatic volume of interest, and riser response data specifying riser displacement values as a function of time. The method may include obtaining, from the non-transient electronic storage, a machine learning algorithm. The method may include generating, with the one or more physical computer processors, a riser response model by applying a machine learning algorithm to the training data. The method may include storing, in the non-transient electronic storage, the riser response model.

These and other features, and characteristics of the present technology, as well as the methods of operation and functions of the related elements of structure and the combination of parts, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Offshore drilling operations may use an underwater, or subsea, wellhead coupled to a riser for wells. Wellheads may require repairs to avoid wellhead failure. Expected wellhead failure may be predicted by using sensors on, or near, wellheads that may measure the displacement from which the stresses and strains can be calculated. These sensors are inconvenient and costly to deploy and retrieve, and existing technologies do not allow for any real-time data to be displayed. Other techniques to determine stresses on the wellheads may include creating a mathematical model based on various assumptions to conservatively estimate wellhead fatigue damage. The presently disclosed technology may be used to generate a virtual sensor using environmental data, tension data, mud data, and training riser response data to predict riser response from which the wellhead stress, strain and fatigue can be calculated, as will be described herein.

Systems and methods disclosed herein may be configured to predict changes to a wellhead coupled to a riser. A model may be generated using environmental data, tension data, mud data, and riser response data. The model may be used to predict riser response data based on target environmental data, target tension data, and mud data. The predicted riser response data may be transformed into predicted wellhead fatigue data indicating stress, or wear and tear, on a wellhead without requiring sensors on, or near, the wellhead. The predicted wellhead fatigue data may be used to generate a representation of the stress using visual effects. The representation may be displayed.

Figure 1A:
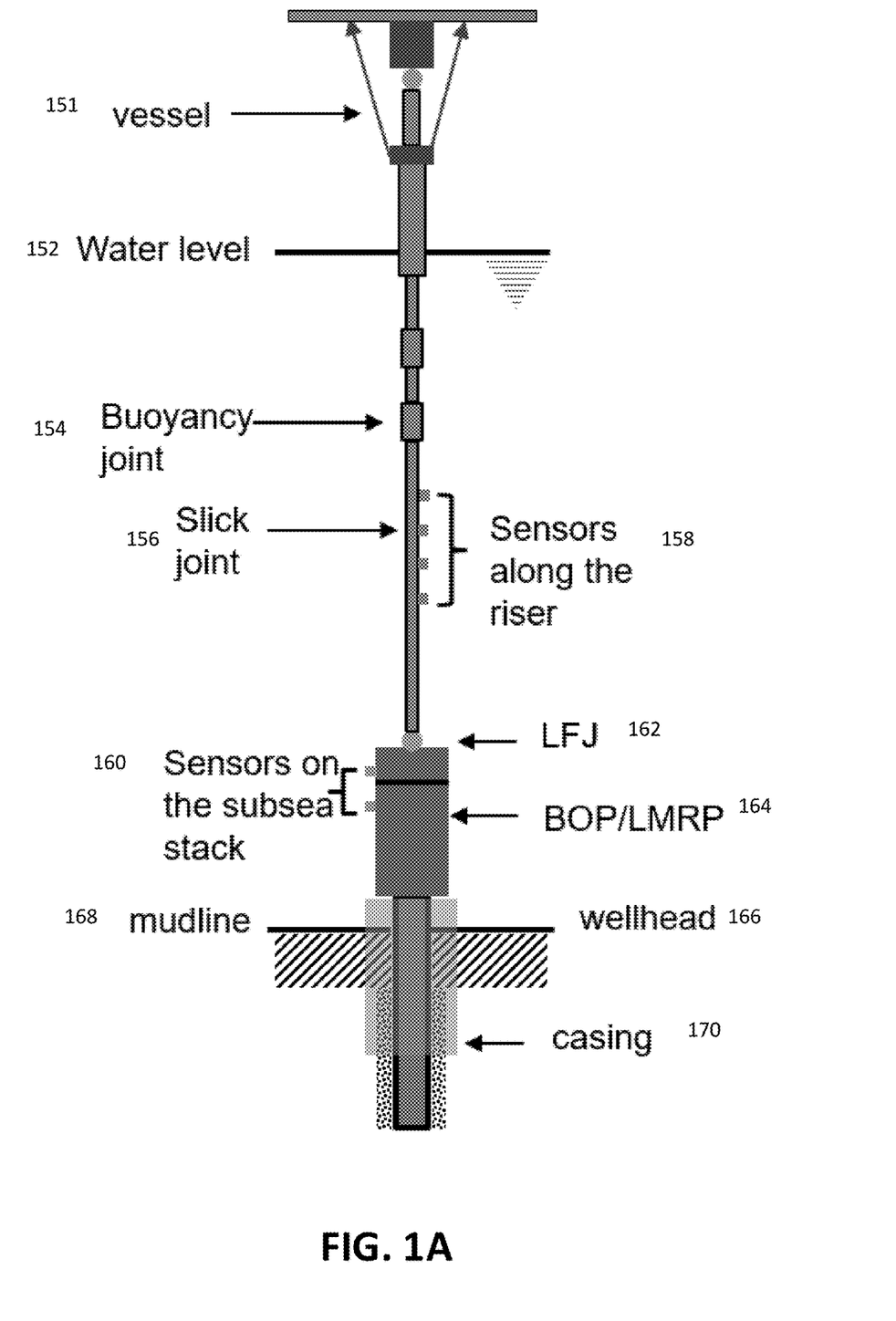
FIG. 1A illustrates an example wellhead setup, in accordance with one or more implementations.

FIG. 1A illustrates an example wellhead setup, in accordance with one or more implementations. Vessel 151 may be on top of waver level 152. Water level 152, or water surface, may be at the top of wellhead setup 150. At the top of the riser, buoyancy joint 154 may help maintain stability of the riser. Slick joint 156 may allow blowout preventer/lower marine riser package (BOP/LMRP) 164 closure and to allow control fluid down to wellhead 166. Sensors 158 along the riser may measure displacement of the riser at a given depth, inclination angle of the riser, and/or other measurements. Sensors 160 on the subsea stack may measure displacement of the subsea stack, inclination angle, acceleration, and/or other measurements. Lower flexible joint (LFJ) 162 may couple the riser to the wellhead via BOP/LMRP 164. BOP/LMRP 164 may be a large valve and/or like devices used to seal, control, and monitor wells to prevent uncontrolled release of fluids from a well. The wellhead 166 may be a system of spools, valves, adapters, and/or other components to provide pressure control and/or access to a production well. Mudline 168 may represent the sea floor. Casing 170 may surround fluids entering/leaving the production well.

Figure 1B:
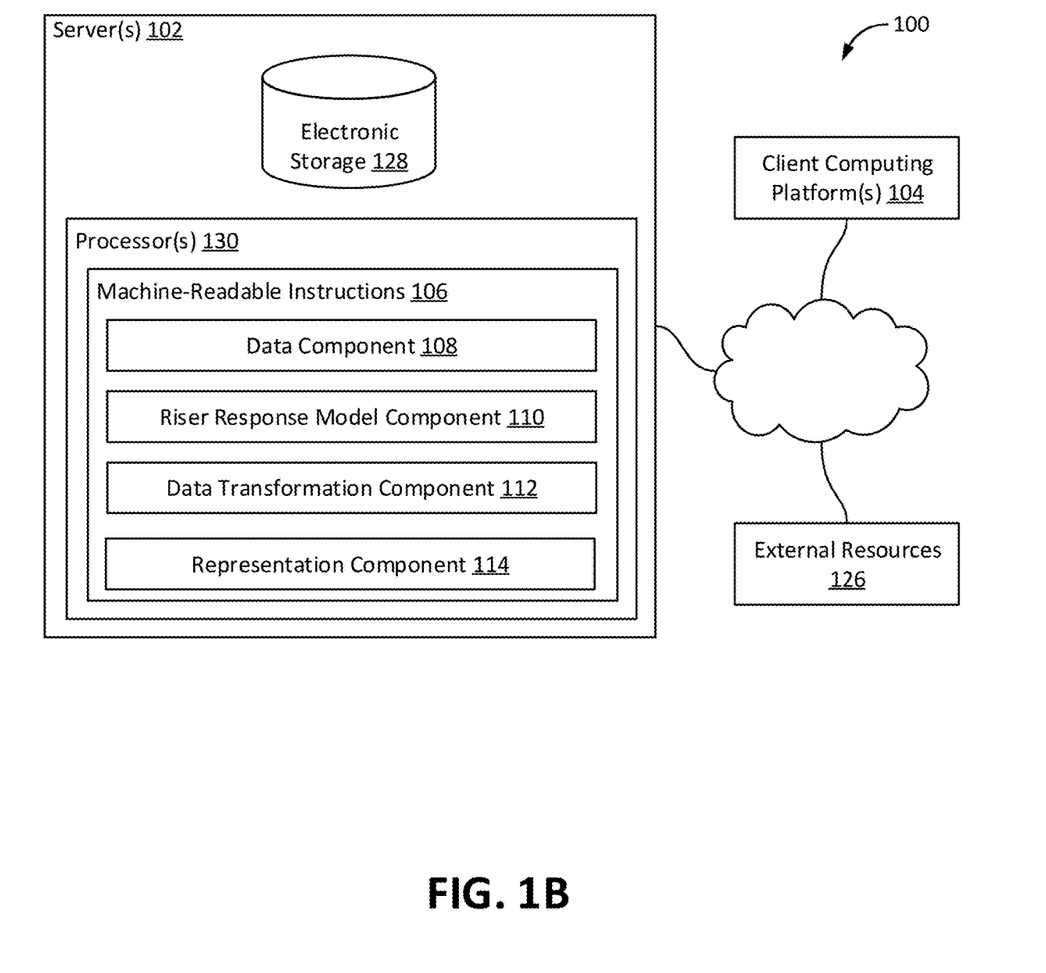
FIG. 1B illustrates a system configured for predicting physical changes to a wellhead in an aquatic volume of interest, in accordance with one or more implementations.

FIG. 1B illustrates a system 100 configured for predicting physical changes to a wellhead in an aquatic volume of interest, in accordance with one or more implementations. An aquatic volume of interest may include an aquatic surface (e.g., interface of a body of water exposed to air), an aquatic floor, space in between the aquatic surface and the aquatic floor, and/or anything in contact with the aquatic body. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of a data component 108, a riser response model component 110, a data transformation component 112, a representation component 114, and/or other instruction components.

Data component 108 may be configured to obtain training data. The training data may include environmental data, tension data, and mud data corresponding to the aquatic volume of interest. The environmental data may specify one or more environmental parameter values affecting the riser in the aquatic volume of interest as a function of time, riser stack up data, and/or riser response data specifying riser displacement values as a function of time. Riser stack up data may include design information including, but not limited to, geometrical data and material of the riser and the equipment connected to the riser. The one or more environmental parameter values may correspond to multiple, different environmental parameters. The tension data may correspond to tension on the riser, tension on the wellhead, and/or other tension data. The mud data may correspond to mud weight data, mud density data, and/or other mud data.

By way of non-limiting example, one or more environmental parameters corresponding to the environmental parameter data may include one or more of a current speed in the aquatic volume of interest as a function of time and depth, a current direction in the aquatic volume of interest as a function of time and depth, a wave height in the aquatic volume of interest as a function of time, a wave direction in the aquatic volume of interest as a function of time, a wave period in the aquatic volume of interest as a function of time, a response amplitude operator for the riser and/or wellhead, tension affecting the riser and/or wellhead as a function of time, and/or other environmental data.

For example, the current speed may be the speed, or velocity, of an ocean current at a given time and depth. The current direction may be the direction of the current at a given time and depth. The wave height may be the height of a wave at the surface of the water. The wave direction may be the direction of the wave at the surface of the water. The wave period may be the amount of time between peaks or troughs in the wave. A response amplitude operator may be used to model the effect of the ocean on the riser and/or the wellhead. The tension may be the force other components may have on a given component (e.g., the force placed onto a riser and/or wellhead from each other or from a BOP, as those components are described above in FIG. 1A). The mud weight/density may be the density of the drilling fluid.

The one or more environmental parameter values may be weighted based on an effect on the riser. For example, as current speed increases, riser response data may change at a linear rate. However, as an example, as current direction changes, riser response data may not change at all. In these examples, current speed may be weighted more while current direction may be weighted less, or given no weight. In some implementations, a soil property may be specific to the aquatic volume of interest and will be given no weight because the soil property is spatially-dependent to the aquatic volume of interest, and the final model is intended to be local.

Figure 4:
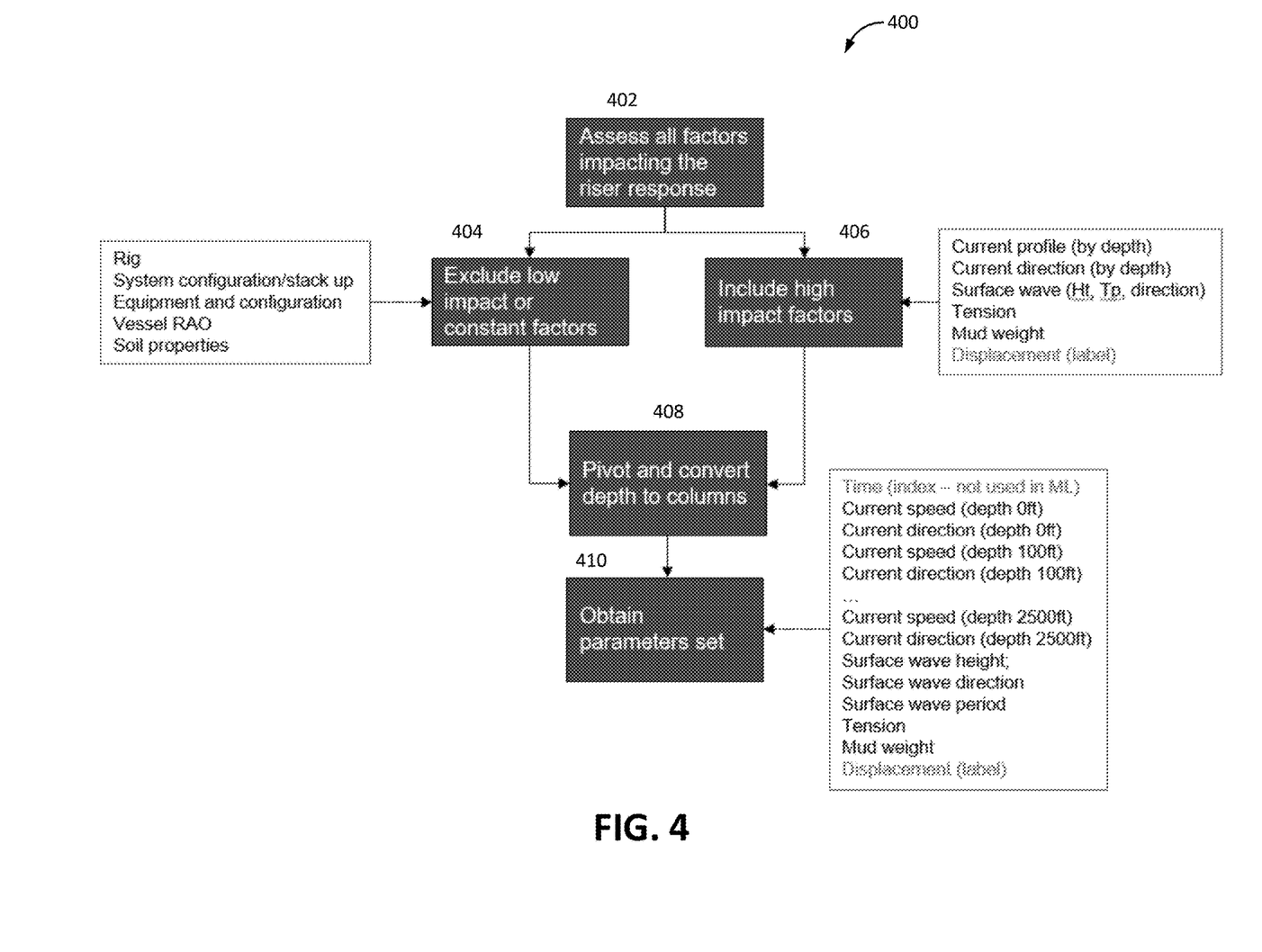
FIG. 4 illustrates an example process to weight parameters, in accordance with one or more implementations.

FIG. 4 illustrates an example process to weight parameters, in accordance with one or more implementations. At 402, all environmental parameters may be assessed or weighted. At 404, the environmental parameters with a low effect, or impact, on the riser response data may be weighted less or not at all. At 406, the environmental parameters with a greater effect may be weighted more. At 408, the weighted environmental parameter values may be ordered by a time index and labeled with the corresponding sensor riser measurement data. In some implementations, all of the measurements that include a depth value may be ordered into a same set of data (e.g., current speed and direction at 0 ft, 100 ft, 200 ft, etc. may be in the same set of data because they are all taken at a given time). At 410, the corresponding parameters from using process 400 may be obtained.

Referring back to FIG. 1B, the riser response data may correspond to deformations to the riser, movement of the riser in three-dimensional space, and/or other displacement of the riser. The riser response data may be time-dependent.

Data component 108 may be configured to obtain target environmental data, target tension data, and target mud data corresponding to the aquatic volume of interest. The target environmental data may specify the one or more environmental parameter values as a function of time. The target tension data may specify the one or more tension parameter values as a function of time. The target mud data may specify the one or more mud parameter values as a function of time.

Riser response model component 110 may be configured to obtain a machine learning algorithm.

Riser response model component 110 may be configured to generate a riser response model by applying the machine learning algorithm to the training data. The machine learning algorithm may include, for example, regression algorithms, neural networks, etc.

Riser response model component 110 may be configured to store the riser response model.

Riser response model component 110 may be configured to apply riser response model to the target environmental data, the target tension data, and the target mud data corresponding to the aquatic volume of interest to generate predicted riser response data. Predicted riser response data may specify displacement values as a function of time. Target environmental data, target tension data, and target mud data may be real-time data, allowing system 100 to make dynamic predictions.

Data transformation component 112 may be configured to transform the predicted riser response data to predicted wellhead fatigue data. The predicted wellhead fatigue data may specify predicted wellhead fatigue values as a function of time. Predicted wellhead fatigue values may include predicted cumulative wear on the wellhead, remaining useful fatigue life of the wellhead, hotspot stress on the wellhead, and/or other wellhead information. Transforming the predicted riser response data may include generating a wellhead model to transform riser response data to the predicted wellhead fatigue data based on the relationship between riser stack up data and wellhead data. The wellhead model may include and/or use one or more of wellhead data, environmental data, tension data, mud data, and riser response data. Based on riser stack up data and wellhead data, a model may be developed to transform riser response data into wellhead data. In some implementations, the wellhead model may be a transfer function. It should be appreciated that the transfer function and or other correlations, or relationships, to transform riser response data into wellhead data may be generated using a physical model of the wellhead and/or riser system.

The wellhead data may include one or more of a wellhead configuration, material used in the wellhead, soil data specifying p-y values, and cement data. For example, a wellhead configuration may be the geometry of the wellhead, placement of welds, how components of the wellhead fit together, components interacting with/affecting the wellhead, and/or other relevant information. Material used in the wellhead may include steel for a first component, solder having different types of elements in different amounts for a second component, etc. and the corresponding data about those materials (e.g., shear levels, density, etc.). Soil data may include p-y curves which may be the soil resistance (e.g., soil pressure per unit length of a pile as a function of deflection), T-Z curves (e.g., induced shear stress as a function of vertical movement), and/or other soil data. Cement data may include cement material properties (e.g., tensile strength, compression strength, etc.) and cement levels.

Transforming the predicted riser response data may include generating the predicted wellhead fatigue data by applying the wellhead model to the predicted riser response data. It should be appreciated that the wellhead model may be applied to any riser response data to generate corresponding wellhead data.

Representation component 114 may be configured to generate a representation of predicted changes to the wellhead using visual effects to depict at least a portion of the predicted wellhead fatigue data corresponding to the aquatic volume of interest. In implementations, a visual effect may include one or more visual transformations of the representation. A visual transformation may include one or more visual changes in how the representation is presented or displayed. In some implementations, a visual transformation may include one or more of a color gradient, a visual zoom, a visual filter, a visual rotation, and/or a visual overlay (e.g., text and/or graphics overlay). The predicted changes may be represented by different colors at different values. For example, a heat map may be used, where blues and greens represent "safe" spots with lower predicted wellhead fatigue data, while reds and yellows may represent "hot" spots with higher predicted wellhead fatigue data. It should be appreciated that different values may correspond to different colors for different applications.

In implementations, a stress plot may be an output of the system of FIG. 1B. For example, the stress plot may be a dynamically changing representation of a wellhead as target environmental data, target tension data, and target mud data is obtained and processed. For example, stress may be greater where pipes are coupled together and weaker toward the bottom of the wellhead.

Representation component 114 may be configured to display the representation.

In some implementations, server(s) 102, client computing platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may include non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a physical computer processor, a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, and/or 114, and/or other components. Processor(s) 130 may be configured to execute components 108, 110, 112, and/or 114, and/or other components by software; hardware; firmware; some combination of software, hardware, and/or firmware; and/or other mechanisms for configuring processing capabilities on processor(s) 130. Processor(s) 130 may be configured to present information on a graphical user interface. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described herein is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As an example, processor(s) 130 may be configured to execute one or more additional components that may perform some or all of the functionality attributed herein to one of components 108, 110, 112, and/or 114.

Figure 2:
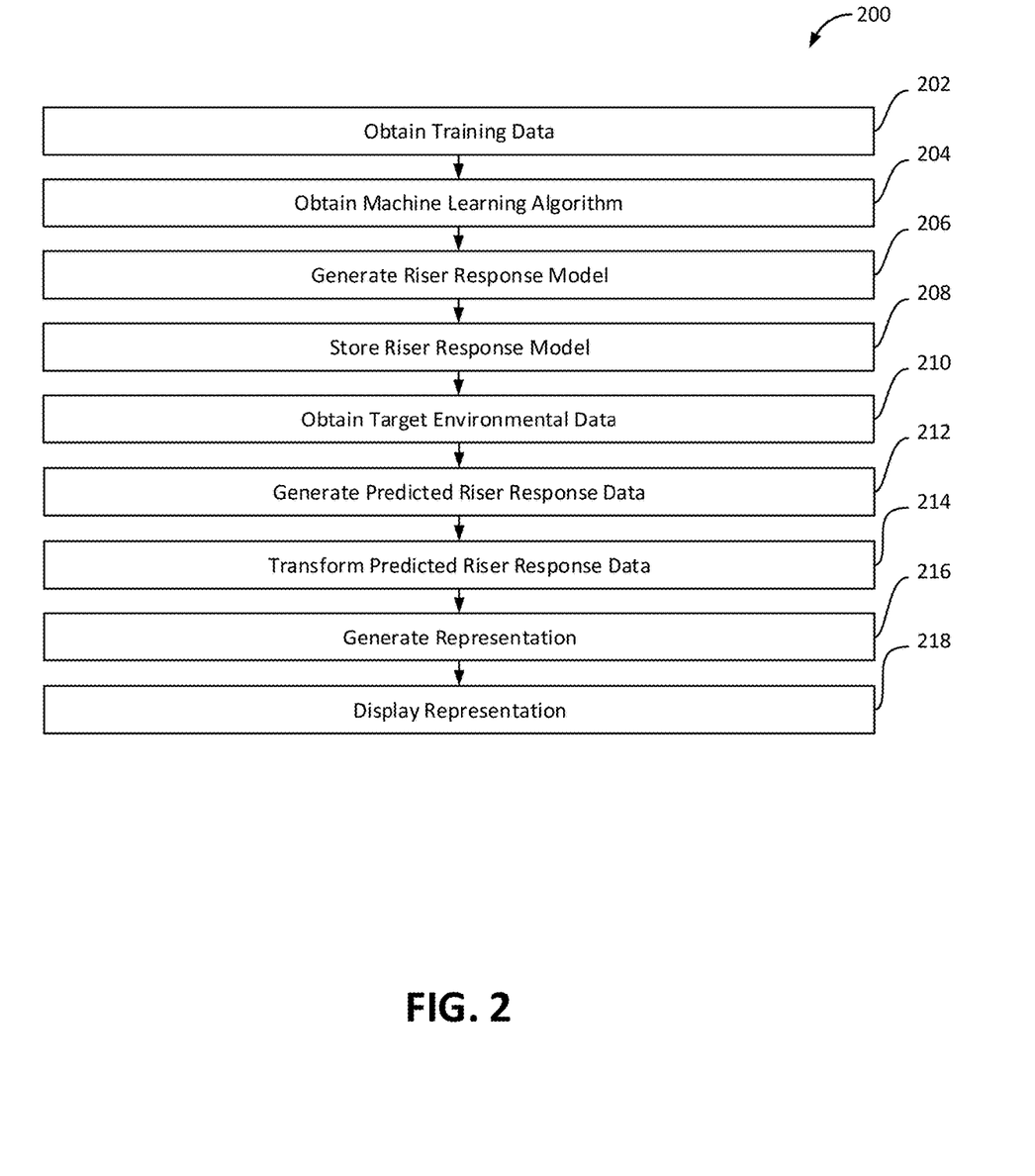
FIG. 2 illustrates a method for predicting physical changes to a wellhead in an aquatic volume of interest, in accordance with one or more implementations.

FIG. 2 illustrates a method 200 for predicting physical changes to a wellhead in an aquatic volume of interest, in accordance with one or more implementations. The operations of method 200 and processes 300, 400, 500, and 600 presented herein are intended to be illustrative. In some implementations, method 200 and processes 300, 400, 500, and 600 may be accomplished with one or more additional operations not described, and/or without one or more of the operations discussed. Additionally, the order in which the operations of method 200 and processes 300, 400, 500, and 600 are illustrated in FIGS. 2, 3, 4, 5, and 6 and described herein is not intended to be limiting.

In some implementations, method 200 and processes 300, 400, 500, and 600 may be implemented in one or more processing devices (e.g., a digital processor, a physical computer processor, an analog processor, a digital circuit designed to process information, an analog circuit designed to process information, a state machine, and/or other mechanisms for electronically processing information). The one or more processing devices may include one or more devices executing some or all of the operations of method 200 and processes 300, 400, 500, and 600 in response to instructions stored electronically on an electronic storage medium. The one or more processing devices may include one or more devices configured through hardware, firmware, and/or software to be specifically designed for execution of one or more of the operations of method 200 and processes 300, 400, 500, and 600.

An operation 202 may include obtaining training data. The training data may include environmental data, tension data, and mud data corresponding to the aquatic volume of interest. The environmental data may specify one or more environmental parameter values affecting the riser in the aquatic volume of interest as a function of time. The tension data may specify the one or more tension parameter values as a function of time. The mud data may specify the one or more mud parameter values as a function of time. The training data may include riser response data specifying riser displacement values as a function of time. Operation 202 may be performed by one or more physical computer processors configured by machine-readable instructions including a component that is the same as or similar to data component 108, in accordance with one or more implementations.

In implementations, the environmental data may include one or more of a current speed in the aquatic volume of interest as a function of time and depth, a current direction in the aquatic volume of interest as a function of time and depth, a wave height in the aquatic volume of interest as a function of time, a wave direction in the aquatic volume of interest as a function of time, a wave period in the aquatic volume of interest as a function of time, a response amplitude operator for the riser, and/or other environmental data.

An operation 204 may include obtaining a machine learning algorithm. Operation 204 may be performed by one or more physical computer processors configured by machine-readable instructions including a component that is the same as or similar to riser response model component 110, in accordance with one or more implementations.

An operation 206 may include generating a riser response model by applying the machine learning algorithm to the training data. The machine learning algorithm may include a neural network regression and/or other machine learning algorithms. Operation 206 may be performed by one or more physical computer processors configured by machine-readable instructions including a component that is the same as or similar to riser response model component 110, in accordance with one or more implementations.

An operation 208 may include storing the riser response model. Operation 208 may be performed by one or more physical computer processors configured by machine-readable instructions including a component that is the same as or similar to riser response model component 110, in accordance with one or more implementations.

An operation 210 may include obtaining target environmental data, target tension data, and target mud data. Target environmental data, target tension data, and target mud data may include dynamic, real-time data. Operation 208 may be performed by one or more physical computer processors configured by machine-readable instructions including a component that is the same as or similar to data component 108, in accordance with one or more implementations.

An operation 212 may include generating predicted riser response data. The predicted riser response data may be generated by applying the riser response model to the target environmental data, the target tension data, and the target mud data. Operation 208 may be performed by one or more physical computer processors configured by machine-readable instructions including a component that is the same as or similar to riser response model component 110, in accordance with one or more implementations.

An operation 214 may include transforming the predicted riser response data to predicted wellhead fatigue data. The predicted wellhead fatigue data may specify predicted wellhead fatigue values as a function of time. Operation 208 may be performed by one or more physical computer processors configured by machine-readable instructions including a component that is the same as or similar to data transformation component 112, in accordance with one or more implementations.

In implementations, transforming the predicted riser response data may include obtaining wellhead data. The wellhead data may specify one or more wellhead parameter values affecting the wellhead. The one or more wellhead parameter values may include one or more of a wellhead configuration, material used in the wellhead, soil data specifying p-y values, soil data specifying T-Z values, cement data specifying cement property values, and cement data specifying cement level values.

In some implementations, transforming the predicted riser response data may include generating a wellhead model, or transfer function, to transform riser response data to the predicted wellhead fatigue data based on riser stack up data and the wellhead data.

In implementations, transforming the predicted riser response data may include generating the predicted wellhead fatigue data by applying the wellhead model to the predicted riser response data.

An operation 216 may include generating a representation of predicted changes to the wellhead in the aquatic volume of interest. The representation may include visual effects to depict at least a portion of the predicted wellhead fatigue data corresponding to the aquatic volume of interest. Operation 208 may be performed by one or more physical computer processors configured by machine-readable instructions including a component that is the same as or similar to representation component 114, in accordance with one or more implementations.

An operation 218 may include displaying the representation. Operation 208 may be performed by one or more physical computer processors configured by machine-readable instructions including a component that is the same as or similar to representation component 114, in accordance with one or more implementations.

Figure 3:
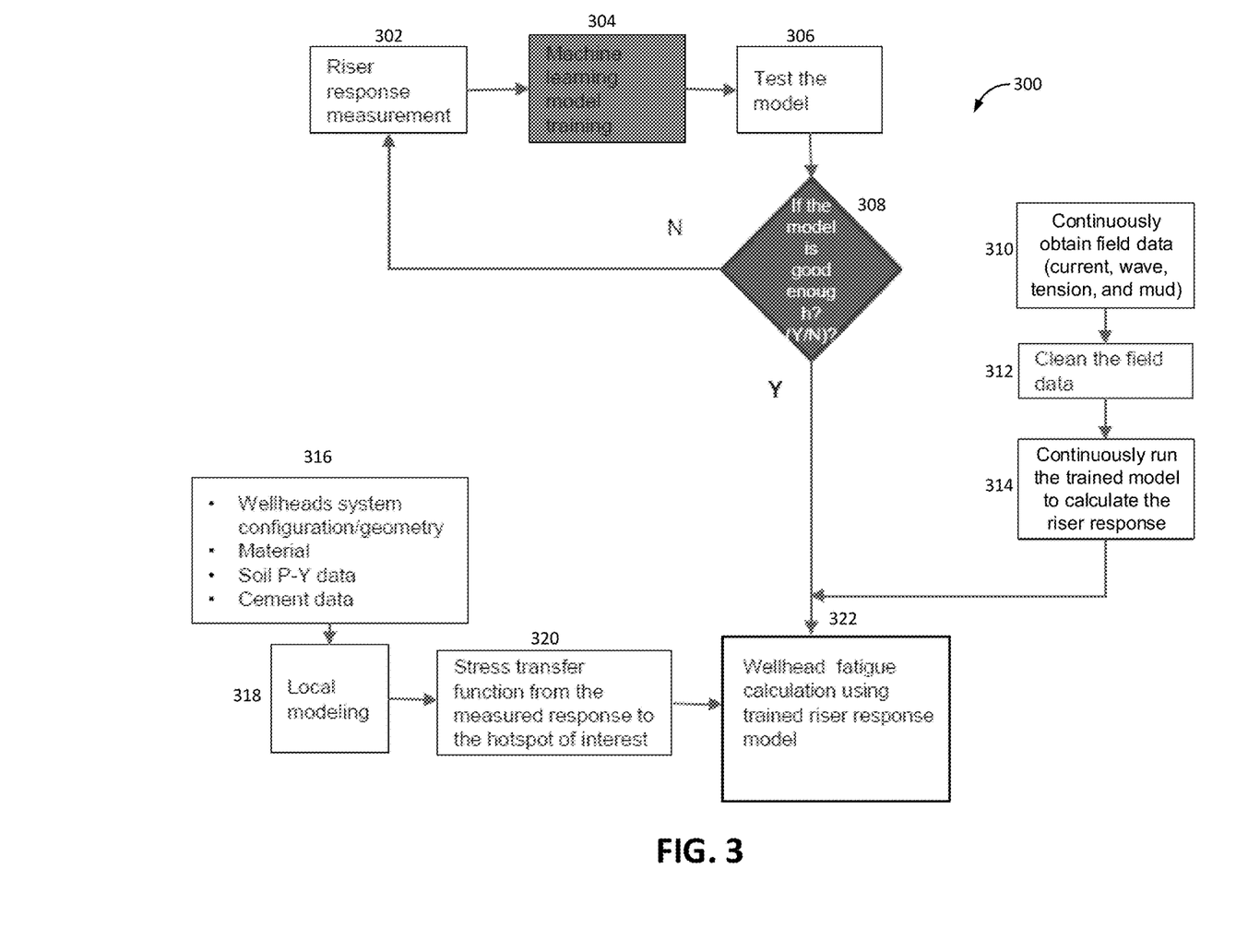
FIG. 3 illustrates an example process to predict physical changes to a wellhead in an aquatic volume of interest, in accordance with one or more implementations.

FIG. 3 illustrates an example process to predict physical changes to a wellhead in an aquatic volume of interest, in accordance with one or more implementations. At 302, one or more sensors on the riser may measure the response of the riser in the aquatic volume of interest based on multiple environmental parameters, tension parameters, and mud parameters. At 304, the environmental data, tension data, mud data, and the riser response data may be used as training data for the machine learning algorithm. In some implementations, only some of the riser response data corresponding to the aquatic volume of interest may be used to generate the riser response model. At 306, a riser response model may be tested, or validated, against the remaining riser response data corresponding to the aquatic volume of interest. At 308, when the riser response model surpasses a success rate threshold, the model may be properly validated. It should be appreciated that different success rate thresholds may be used for different applications.

At 310, real-time field data, or environmental data, tension data, and mud data may be obtained. At 312, the environmental data, tension data, and mud data may be cleaned. Cleaning may include handling empty/null values, non-numerical values, noise data for numerical parameters, etc. For example, non-numerical values may be converted into categorical types. At 314, the real-time data may be applied to the riser response model to generate predicted riser response data based on the environmental data, the tension data, and the mud data.

At 316, different data may be obtained. At 318, the data may be used for building a wellhead model. At 320, the riser response data may be transformed to predicted wellhead fatigue data at any hotspots of interest. At 322, the predicted wellhead fatigue data may be used to generate a representation.

Figure 5:
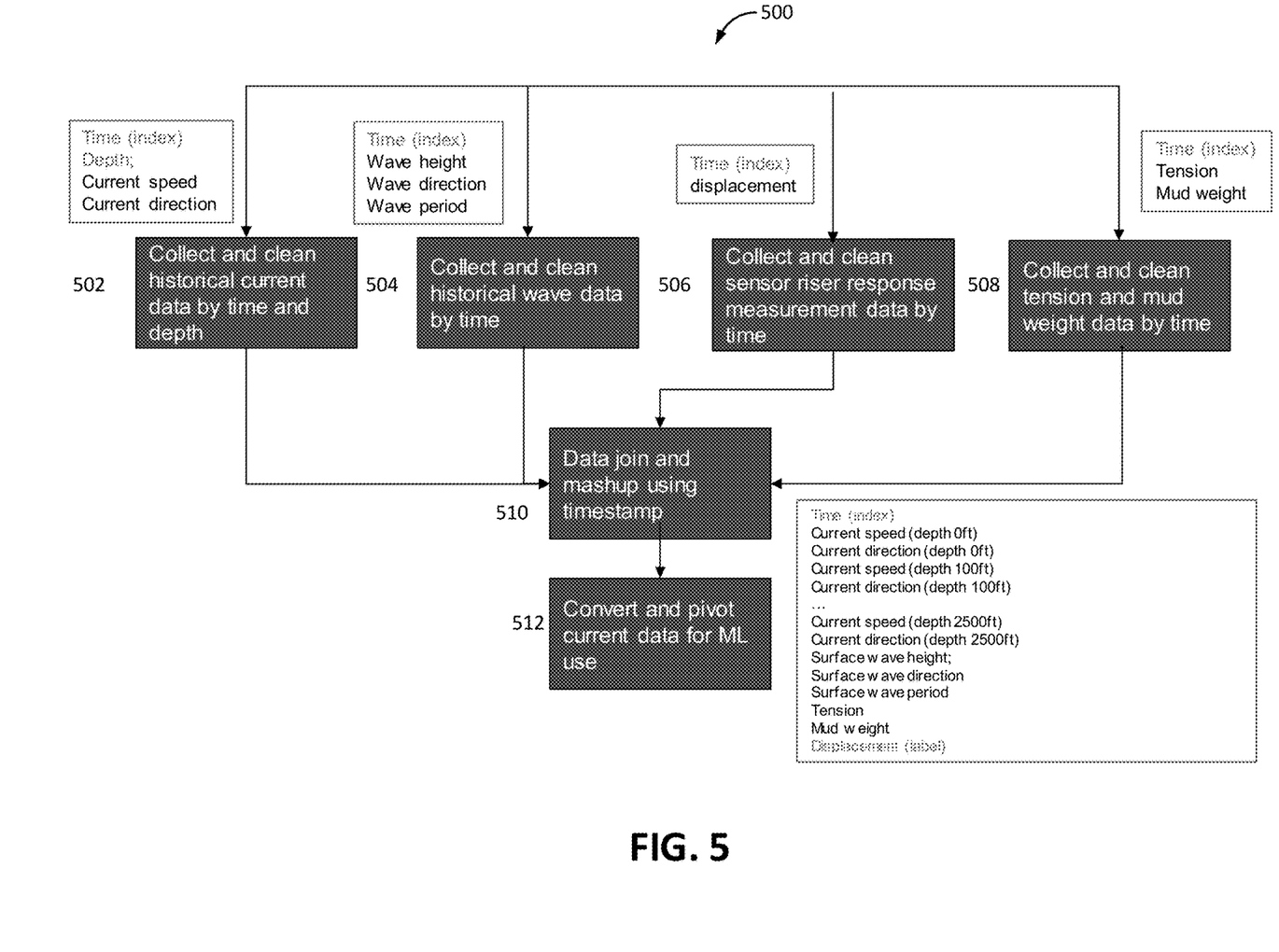
FIG. 5 illustrates an example process of preparing training data, in accordance with one or more implementations.

FIG. 5 illustrates an example process of preparing training data, in accordance with one or more implementations. At 502, historical, or previous, current data may be collected by times and depths. The collected current data may be cleaned. For example, current data may be taken at multiple, different times and at multiple, different depths (e.g., current data may be taken from twenty-four months ago at 100 m, twenty-four months ago at 50 m twenty-four months ago at 25 m, twenty-three months ago at 100 m, twenty-three months ago at 50 m twenty-three months ago at 25 m, etc. It should be appreciated that the precision of the data can be improved by using smaller intervals between data points.

At 504, wave data may be obtained, or collected, by corresponding times. The collected wave data may be cleaned. These may have the same time intervals as the current data. At 506, sensor riser response measurement data may be collected by corresponding times, similar to the wave data. The collected sensor riser response data may be cleaned. At 508, the tension and mud data may be collected by corresponding times, similar to the wave data. The collected tension and mud data may be cleaned. At 510, the data from 502 to 508 may be combined and ordered by a time index (e.g., all data taken at 24 months ago is ordered together). At 512, the current data, wave data, tension data, and mud data may be collected and labeled according to the corresponding sensor riser response measurement data. The multiple sets of data may be used as input for generating the riser response model.

Figure 6:
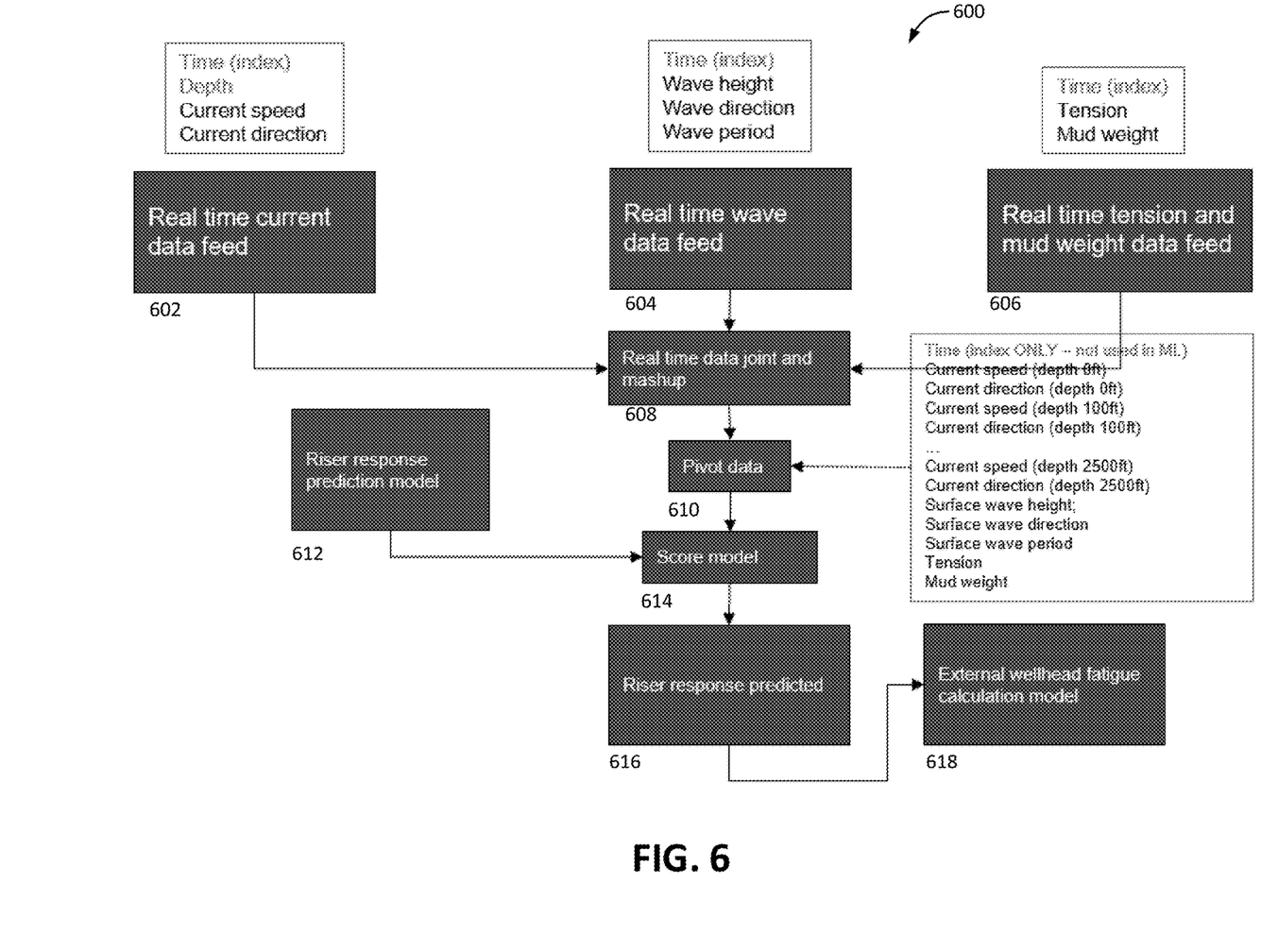
FIG. 6 illustrates an example process of predicting physical changes to a wellhead in an aquatic volume of interest, in accordance with one or more implementations.

FIG. 6 illustrates an example process of predicting physical changes to a wellhead in an aquatic volume of interest, in accordance with one or more implementations. At 602, real-time current data may be collected and/or dynamically presented via a live feed. At 604, real-time wave data may be collected and/or dynamically presented via a live feed. At 606, real-time tension and mud data may be collected and/or dynamically presented via a live feed. At 608, the data may be combined together using a time index. At 610, the combined data may be prepared for the riser response model (e.g., pivoted). At 612, the riser response model may be obtained. At 614, the riser response model may be applied to the combined data. At 616, predicted riser response data may be generated. At 618, the predicted riser response data may be used to calculate, or generate, the predicted wellhead fatigue data.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer-implemented method for predicting physical changes to a wellhead coupled to a riser in an aquatic volume of interest, the method being implemented in a computer system that includes one or more physical computer processors, non-transient electronic storage, and a graphical user interface, comprising:

obtaining, from the non-transient electronic storage, training data, wherein the training data includes (i) environmental data, corresponding to the aquatic volume of interest, specifying one or more environmental parameter values affecting the riser in the aquatic volume of interest as a function of time, (ii) tension data, corresponding to the aquatic volume of interest, specifying one or more tension parameter values affecting the riser in the aquatic volume of interest as a function of time, (iii) mud data, corresponding to the aquatic volume of interest, specifying one or more mud parameter values affecting the riser in the aquatic volume of interest as a function of time, and (iv) riser response data specifying riser displacement values as a function of time;

obtaining, from the non-transient electronic storage, a machine learning algorithm;

generating, with the one or more physical computer processors, a riser response model by applying the machine learning algorithm to the training data;

storing, in the non-transient electronic storage, the riser response model;

obtaining, from the non-transient electronic storage, target environmental data, target tension data, and target mud data, corresponding to the aquatic volume of interest, the target environmental data specifying the one or more environmental parameter values as a function of time, the target tension data specifying the one or more tension parameter values as a function of time, and the target mud data specifying the one or more mud parameter values as a function of time;

generating, with the one or more physical computer processors, predicted riser response data by applying riser response model to the target environmental data, the target tension data, and the target mud data, wherein the riser response model operates as a virtual sensor for the wellhead to predict riser response based on the target environmental data, the target tension data, and the target mud data;

transforming, with the one or more physical computer processors, the predicted riser response data to predicted wellhead fatigue data specifying predicted wellhead fatigue values as a function of time;

generating, with the one or more physical computer processors, a visual representation of predicted changes to the wellhead using visual effects to depict at least a portion of the predicted wellhead fatigue data corresponding to the aquatic volume of interest; and displaying, via the graphical user interface, the visual representation.

2. The computer-implemented method of claim 1, wherein transforming the predicted riser response data comprises:

obtaining, from the non-transient electronic storage, wellhead data, wherein the wellhead data specifies one or more wellhead parameter values affecting the wellhead;

generating, with the one or more physical computer processors, a wellhead model to transform riser response data to the predicted wellhead fatigue data based on the wellhead data and riser stack up data; and generating, with the one or more physical computer processors, the predicted wellhead fatigue data by applying the wellhead model to the predicted riser response data.

3. The computer-implemented method of claim 2, wherein the wellhead data comprises one or more of a wellhead configuration, material used in the wellhead, soil data specifying p-y values, soil data specifying T-Z values, cement data specifying cement property values, and cement data specifying cement level values.

4. The computer-implemented method of claim 1, wherein one or more environmental parameters corresponding to the environmental parameter data comprise one or more of a current speed in the aquatic volume of interest as a function of time and depth, a current direction in the aquatic volume of interest as a function of time and depth, a wave height in the aquatic volume of interest as a function of time, a wave direction in the aquatic volume of interest as a function of time, a wave period in the aquatic volume of interest as a function of time, and a response amplitude operator for the riser.

5. The computer-implemented method of claim 1, wherein individual ones of the one or more environmental parameter values, the one or more tension parameter values, and the one or more mud parameter values are weighted.

6. The computer-implemented method of claim 1, wherein the machine learning algorithm comprises a neural network regression.

7. A computer-implemented method for predicting physical changes to a wellhead coupled to a riser in an aquatic volume of interest, the method being implemented in a computer system that includes one or more physical computer processors, non-transient electronic storage, and a graphical user interface, comprising:

obtaining, from the non-transient electronic storage, target environmental data, target tension data, and target mud data corresponding to the aquatic volume of interest, the target environmental data specifying one or more environmental parameter values as a function of time, the target tension data specifying one or more tension parameter values as a function of time, and the target mud data specifying one or more mud parameter values as a function of time;

obtaining, from the non-transient electronic storage, a riser response model, the riser response model having been generated by applying a machine learning algorithm to training data, wherein the training data includes (i) environmental data, corresponding to the aquatic volume of interest, specifying the one or more environmental parameter values affecting the riser in the aquatic volume of interest as a function of time, (ii) tension data, corresponding to the aquatic volume of interest, specifying the one or more tension parameter values affecting the riser in the aquatic volume of interest as a function of time, (iii) mud data, corresponding to the aquatic volume of interest, specifying the one or more mud parameter values affecting the riser in the aquatic volume of interest as a function of time, and (iv) riser response data specifying riser displacement values as a function of time;

generating, with the one or more physical computer processors, predicted riser response data by applying the riser response model to the target environmental data, the target tension data, and the target mud data, wherein the riser response model operates as a virtual sensor for the wellhead to predict riser response based on the target environmental data, the target tension data, and the target mud data;

transforming, with the one or more physical computer processors, the predicted riser response data to predicted wellhead fatigue data specifying predicted wellhead fatigue values as a function of time;

generating, with the one or more physical computer processors, a visual representation of predicted changes to the wellhead using visual effects to depict at least a portion of the predicted wellhead fatigue data corresponding to the aquatic volume of interest; and displaying, via the graphical user interface, the visual representation.

8. The computer-implemented method of claim 7, wherein transforming the predicted riser response data comprises:

obtaining, from the non-transient electronic storage, wellhead data, wherein the wellhead data specifies one or more wellhead parameter values affecting the wellhead;

generating, with the one or more physical computer processors, a wellhead model to transform riser response data to the predicted wellhead fatigue data based on the wellhead data and riser stack up data; and generating, with the one or more physical computer processors, the predicted wellhead fatigue data by applying the wellhead model to the predicted riser response data.

9. The computer-implemented method of claim 8, wherein the wellhead data comprises one or more of a wellhead configuration, material used in the wellhead, soil data specifying p-y values, soil data specifying T-Z values, cement data specifying cement property values, and cement data specifying cement level values.

10. The computer-implemented method of claim 7, wherein one or more environmental parameters corresponding to the environmental parameter data comprise one or more of a current speed in the aquatic volume of interest as a function of time and depth, a current direction in the aquatic volume of interest as a function of time and depth, a wave height in the aquatic volume of interest as a function of time, a wave direction in the aquatic volume of interest as a function of time, a wave period in the aquatic volume of interest as a function of time, and a response amplitude operator for the riser.

11. The computer-implemented method of claim 7, wherein individual ones of the one or more environmental parameter values, the one or more tension parameter values, and the one or more mud parameter values are weighted.

12. The computer-implemented method of claim 7, wherein the machine learning algorithm comprises a neural network regression.

13. A system for predicting physical changes to a wellhead coupled to a riser in an aquatic volume of interest, the system comprising:
the wellhead;
the riser coupled to the wellhead;
non-transient electronic storage;
a graphical user interface; and
one or more physical computer processors configured by machine-readable instructions to:
obtain, from the non-transient electronic storage, training data, wherein the training data includes (i) environmental data, corresponding to the aquatic volume of interest, specifying one or more environmental parameter values affecting the riser in the aquatic volume of interest as a function of time, (ii) tension data, corresponding to the aquatic volume of interest, specifying one or more tension parameter values affecting the riser in the aquatic volume of interest as a function of time, (iii) mud data, corresponding to the aquatic volume of interest, specifying one or more mud parameter values affecting the riser in the aquatic volume of interest as a function of time, and (iv) riser response data specifying riser displacement values as a function of time;
obtain, from the non-transient electronic storage, a machine learning algorithm;
generate, with the one or more physical computer processors, a riser response model by applying the machine learning algorithm to the training data;
store, in the non-transient electronic storage, the riser response model;
obtain, from the non-transient electronic storage, target environmental data, target tension data, and target mud data corresponding to the aquatic volume of interest, the target environmental data specifying the one or more environmental parameter values as a function of time, the target tension data specifying the one or more tension parameter values as a function of time, and the target mud data specifying the one or more mud parameter values as a function of time;
generate, with the one or more physical computer processors, predicted riser response data by applying the riser response model to the target environmental data, the target tension data, and the target mud data, wherein the riser response model operates as a virtual sensor for the wellhead to predict riser response based on the target environmental data, the target tension data, and the target mud data;
transform, with the one or more physical computer processors, the predicted riser response data to predicted wellhead fatigue data specifying predicted wellhead fatigue values as a function of time;
generate, with the one or more physical computer processors, a visual representation of predicted changes to the wellhead using visual effects to depict at least a portion of the predicted wellhead fatigue data corresponding to the aquatic volume of interest; and
display, via the graphical user interface, the visual representation.

14. The system of claim 13, wherein transforming the predicted riser response data comprises:
obtaining, from the non-transient electronic storage, wellhead data, wherein the wellhead data specifies one or more wellhead parameter values affecting the wellhead;
generating, with the one or more physical computer processors, a wellhead model to transform riser response data to the predicted wellhead fatigue data based on the wellhead data and riser stack up data; and
generating, with the one or more physical computer processors, the predicted wellhead fatigue data by applying the wellhead model to the predicted riser response data.

15. The system of claim 14, wherein the wellhead data comprises one or more of a wellhead configuration, material used in the wellhead, soil data specifying p-y values, soil data specifying T-Z values, cement data specifying cement property values, and cement data specifying cement level values.

16. The system of claim 13, wherein one or more environmental parameters corresponding to the environmental parameter data comprise one or more of a current speed in the aquatic volume of interest as a function of time and depth, a current direction in the aquatic volume of interest as a function of time and depth, a wave height in the aquatic volume of interest as a function of time, a wave direction in the aquatic volume of interest as a function of time, a wave period in the aquatic volume of interest as a function of time, and a response amplitude operator for the riser.

17. The system of claim 13, wherein individual ones of the one or more environmental parameter values, the one or more tension parameter values, and the one or more mud parameter values are weighted.

18. The system of claim 13, wherein the machine learning algorithm comprises a neural network regression.

* * * * *